No. 612,331. Patented Oct. 11, 1898.
A. L. GREENE, Dec'd.
F. I. GREENE, Administratrix.
SPECTACLES.
(Application filed May 29, 1896.)
(No Model.)
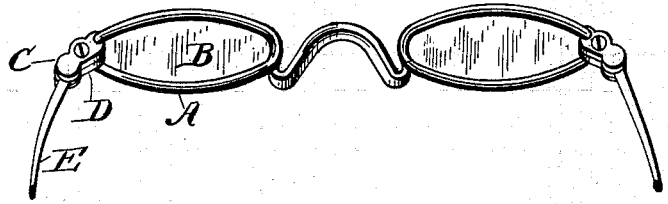
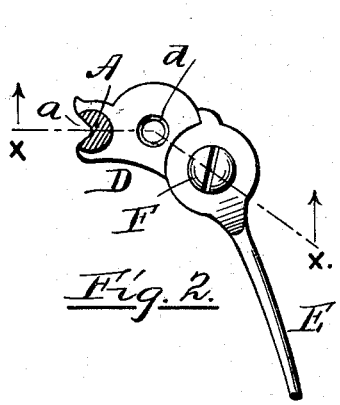
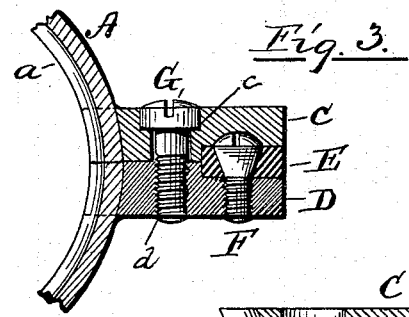
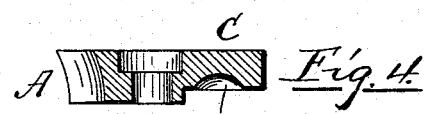
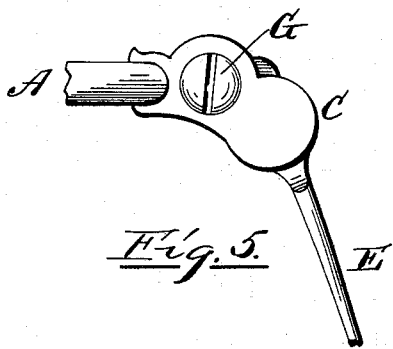
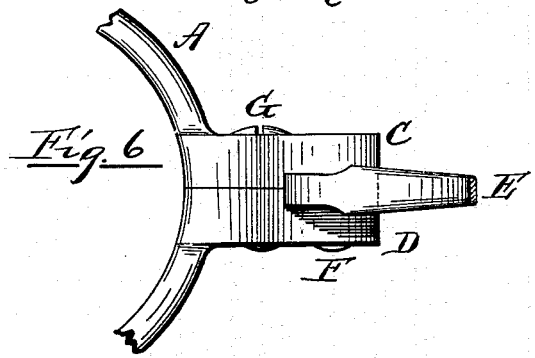
WITNESSES. INVENTOR.
Charles T. Kannigan Albert L. Greene
A. E. Perce By Warren R. Perce
Atty.

UNITED STATES PATENT OFFICE.

ALBERT L. GREENE, OF CRANSTON, RHODE ISLAND; FANNIE IDA GREENE, ADMINISTRATRIX OF SAID ALBERT L. GREENE, DECEASED, ASSIGNOR, BY MESNE ASSIGNMENTS, TO THE PROVIDENCE OPTICAL COMPANY, OF PROVIDENCE, RHODE ISLAND.

SPECTACLES.

SPECIFICATION forming part of Letters Patent No. 612,331, dated October 11, 1898.

Application filed May 29, 1896. Serial No. 593,535. (No model.)

*To all whom it may concern:*

Be it known that I, ALBERT L. GREENE, of the town of Cranston, in the county of Providence, in the State of Rhode Island, have invented a certain new and useful Improvement in Spectacles; and I declare the following to be a specification thereof.

My invention relates to spectacles in general, and more particularly to the frames thereof, my object being to provide such a construction and arrangement that when the frame is opened for the manipulation of a lens the temple-piece will not be displaced; also, to provide means for taking up the wear at the pivotal portion of the temple-piece, as also for eliminating the necessity of alining of more than one series of perforations when clamping the frame.

In the drawings forming a portion of this specification, and in which like letters of reference indicate similar parts in the several views, Figure 1 is a perspective view showing the ears of the rims and the engaging temple-pieces. Fig. 2 is a detail view of the lower ear at one side of the frame, the adjacent portion of the frame being shown in section and the remaining elements, as also the temple-piece, being in elevation. Fig. 3 is a section on line *x x* of Fig. 2, an additional portion of the frame being shown. Fig. 4 is a section of one of the upper ears, showing the perforation for reception of the clamping-screw and the recess to receive the head of the pivot-screw. Fig. 5 is a detail plan view of a portion of one of the lens rims or frames and the adjacent elements comprising the top ear, the clamping-screw, and temple-piece. Fig. 6 is a side view of Fig. 5, all of the elements being in position.

Referring now to the drawings, in operating in accordance with my invention I form upon or secure to the lens rims or frames, adjacent their meeting ends, upper ears C and lower ears D.

In further describing my invention I shall refer to a single element of the frame, together with its ears, temple, clamping-screw, pivot, &c., it being understood that the construction is duplicated for the opposite lens-frame.

Referring now more particularly to Fig. 3, I form vertically through the upper and lower ears C and D, adjacent the contiguous portion of the frame A, which latter is provided with a groove *a* to receive the lens, alining perforations *c* and *d*, (shown, also, in Fig. 2,) the perforation *d* in the ear D being screw-threaded, as shown, to receive the threads of a clamping-screw G, passed into engagement therewith through the perforation *c* in the ear C, which latter perforation is countersunk, as shown, to receive the enlarged head of the clamping-screw G. The adjacent surfaces of the ears C and D are cut away near their outer extremities to form a recess to receive the temple-piece E, said recess being shaped to receive snugly the disk-shaped head of the temple.

Formed centrally of the cut-away portion of the ear D is a screw-threaded perforation adapted to receive a pivot-screw F, passed through a central perforation in the temple-head. The perforation in the temple-head is frusto-conical in form, as shown in Fig. 3, so as to receive snugly the similarly-shaped head of the pivot-screw F. The object of this mutual formation of the pivot-screw head and the perforation of the temple-head is to prevent displacement of the temple when the ears are separated, as also to provide a construction in which the pivot wear may be taken up on the principle of the usual cone adjustment.

Formed in the upper ear C, directly above the pivot-screw F, is a recess *c'*, whose cross-section is a segment of a circle, which recess or depression is adapted to receive a similarly-shaped head of the pivot-screw.

The head of the temple is provided with the usual ear or projection, as shown, adapted to limit the rotation of the head upon its pivot.

It will be seen that in operating in accordance with my invention I provide a means for clamping the frame upon the lens entirely distinct and separate from the means for holding the temple-pieces, and that, moreover, through the medium of my means the displacement of the ears has no effect whatever upon the arrangement of the temple. Furthermore, in the act of clamping through the medium of the screw G there is but a single line of perforations to contend with in alining, the mutual formation of the recess *c'* and the head of the pivot F being such as to guide the ears into their proper relative positions, and thus assist in the alinement. Moreover, as above mentioned, means for compensating for the pivotal wear is provided, all of which advantages are secured by a simple and unique arrangement of elements hereinbefore unknown in this connection.

Having thus described my invention, what I claim is—

1. The combination with spectacle-frames having ears adjacent their meeting ends of means for clamping the ears in engagement, temple-pieces held intermediate the ears pivots adapted to receive the temple-pieces and hold them irrespective of the clamping means said pivots being adapted for adjustment to compensate for wearing.

2. The combination with spectacle-frames having ears adjacent their meeting ends of means for clamping said ears together, temple-pieces held intermediate the ears and pivots positively engaging one of each pair of ears and adapted to hold their respective temple-pieces thereto irrespective of the clamping means said pivots being adapted for adjustment to compensate for wearing.

3. The combination with spectacle-frames having ears adjacent their meeting ends of means for clamping said ears together, temple-pieces held intermediate the ears and pivots positively engaging one of each pair of ears and adapted to hold their respective temple-pieces thereto irrespective of the clamping means.

ALBERT L. GREENE.

Witnesses:
WARREN R. PERCE,
CHARLES D. WOOD.